Patented May 10, 1927.

1,628,528

UNITED STATES PATENT OFFICE.

ERNEST R. BRIDGWATER, OF WILMINGTON, DELAWARE, AND DONALD HOWARD POWERS, OF PENNS GROVE, NEW JERSEY, ASSIGNORS TO E. I. DU PONT DE NEMOURS & COMPANY, OF WILMINGTON, DELAWARE, A CORPORATION OF DELAWARE.

AGE-RESISTING RUBBER COMPOUND AND PROCESS OF MAKING SAME.

No Drawing.   Application filed July 3, 1926.   Serial No. 120,516.

This invention relates to the art of inhibiting the deterioration of goods made wholly or in part from vulcanized rubber by the incorporation of certain agents having the property of retarding the deterioration or aging of the rubber. More particularly the invention involves the coating of the particles of such preserving agent with a finely divided substance or dust before their incorporation with the rubber.

The deterioration of rubber goods on aging is thought to be largely due to oxidation of the rubber or the rubber compound. Many organic compounds which have the property of retarding the oxidation and improving the aging properties of rubber are well known to those familiar with the art of rubber compounding and manufacture. Among them may be mentioned aromatic diamino compounds such as meta-phenylene diamine and benzidine, aromatic dihydroxy compounds such as hydroquinone and aromatic hydroxy-amino compounds such as para-aminophenol. None of these substances is widely used because they have in common several disadvantageous properties, the principal one being that it is very difficult to uniformly disperse them in rubber compounds. Even when they are finely ground there appears to be a tendency for the particles to coalesce. This is exhibited during storage as well as while the material is being incorporated with the rubber.

The primary object of our invention is to disperse such anti-oxidants uniformly throughout the rubber.

Another object is to obtain a maximum and uniform preserving effect from a given quantity of an anti-oxidant.

A final object is to avoid the spotting which commonly results from an uneven distribution of the anti-oxidant.

We have discovered that if the finely divided anti-oxidizing agents are intimately mixed with a more finely divided substance or dust prior to their incorporation in the rubber compound that uniform dispersion of the anti-oxidizing agents throughout the rubber is greatly facilitated. The particles of the finely divided substance coat or cover the particles of the anti-oxidizing agent. This coating of fine particles over the somewhat larger particles of the anti-oxidant compound completely prevents the larger particles from adhering or coalescing during storage or during the operations of mixing, calendering and tubing the unvulcanized rubber or during or after vulcanization.

A variety of methods of obtaining an intimate mixture of anti-oxidizing agent and inert substance may be employed. For example, the anti-aging compound may be precipitated in a suspension of the dust. In a preferred embodiment of our process the anti-aging agent is ground in the presence of the dust or powder. By this method, in addition to effecting a thorough coating of the particles of the agent, the presence of the finely divided dispersing substance makes it possible to grind the anti-oxidant compound more finely than would be otherwise possible, because, in the absence of such substances during the grinding operation, many of the small particles which are produced by breaking up large particles of the anti-aging compound coalesce to again form large particles before they pass out of the grinder. When the finely divided dry inert substance is present, the small particles are probably coated by the mineral substance as soon as they are formed and the inert substance prevents them from coalescing.

Any mill which is suitable for finely grinding organic or inorganic materials may be used for carrying out the invention. The mineral matter may, for example, be precipitated barium sulfate, zinc oxide, finely divided clay, calcium carbonate, silica, or any other fine dry powder. The anti-oxidant material may be any of those mentioned above or any other organic or inorganic compound which has the property of retarding the oxidation or improving the aging properties of rubber. We have successfully practiced this invention using a variety of combinations. For example, we have employed para-aminophenol ground with an equal weight of precipitated barium sulfate; para-aminophenol ground with an equal weight of zinc oxide, and meta-phenylenediamine ground with an equal weight of precipitated barium sulfate. In each of these cases the grinding was done on a large scale with full sized plant equipment.

The following rubber compound will serve to illustrate the application of our invention:

| Ingredients. | Parts. |
|---|---|
| Smoked sheets | 50.0 |
| Pale crepe | 50.0 |
| Zinc oxide (5 volumes) | 30.25 |
| Carbon black (15 volumes) | 28.50 |
| Sulfur | 2.75 |
| Diphenylguanidine | 0.75 |
| An intimate mixture of equal parts of precipitated barium sulfate and para-amino-phenol | 1.50 |
| Total | 163.75 |

In the above example the ingredients were incorporated with the rubber in a type of mixer commonly employed in the art. It is obvious that the percentages of the various ingredients or the proportion of finely divided dry powder to the organic anti-oxidant compound may be varied within wide limits without departing from the spirit of this invention. Any compound may be used which improves the aging properties of rubber and any finely divided material which is adapted to covering the particles of the anti-oxidant compound and preventing their coalescence. Likewise natural, synthetic or reclaimed rubber, or rubber substitutes as gutta percha, may be employed. We, therefore, wish it to be distinctly understood that the invention is not limited to the materials, proportions and methods of mixing described above.

Upon vulcanization a uniformly colored unspotted product is obtained which product shows excellent resistance to aging.

We claim:

1. The process of preserving a cured rubber composition which process comprises incorporating with said composition, prior to curing, an intimate mixture of a finely divided powder and a substance adapted to retard the aging of the rubber.

2. The method of uniformly impregnating a mass comprising rubber with a finely divided anti-aging compound, the particles of which tend to adhere, which method comprises the step of effecting an intimate mixture of said compound with a dust adapted to coat the particles thereof.

3. The method of uniformly distributing an anti-aging compound throughout a mass comprising rubber, which method comprises the step of reducing the anti-aging compound to a state of fine subdivision in the presence of a dry dust adapted to coat the particles thereof.

4. The method of producing a uniformly colored, anti-aging rubber composition which comprises effecting an intimate mixture of a finely divided anti-aging compound and a dry dust adapted to coat the particles of said compound, incorporating the dust coated compound with the rubber and a vulcanizing agent and vulcanizing.

5. The method set forth in claim 4 wherein the anti-aging compound is an aromatic amino compound adapted to retard the oxidation of rubber.

6. The method set forth in claim 4 wherein the anti-aging compound is an aromatic compound having one or more hydroxy groups and one or more amino groups in the nucleus.

7. The method set forth in claim 4 wherein the anti-aging compound is para-amino-phenol and the dust comprises barium sulphate.

8. A uniformly colored rubber composition having distributed throughout its mass a finely divided anti-aging compound, the particles of said compound being coated with an inert dust.

9. An anti-aging rubber composition formed by incorporating with the rubber, prior to its vulcanization, an intimate mixture of a pulverulent dry dust and a finely divided substance adapted to retard the aging of the rubber.

10. An anti-aging rubber composition having uniformly incorporated throughout its mass a finely divided aromatic amino compound adapted to retard the oxidation of the rubber, said compound having been, prior to its incorporation, intimately admixed with a dust adapted to coat the particles thereof.

11. An anti-aging rubber composition having uniformly incorporated throughout its mass finely divided para-amino-phenol, said compound having been, prior to its incorporation, intimately admixed with a dust of barium sulfate.

In testimony whereof we affix our signatures.

ERNEST R. BRIDGWATER.
DONALD H. POWERS.